Sept. 15, 1964  C. E. COOK  3,148,539
IDEAL SPHERICAL HINGE FOR ANALYTICAL FRAMEWORK
Filed Jan. 20, 1959
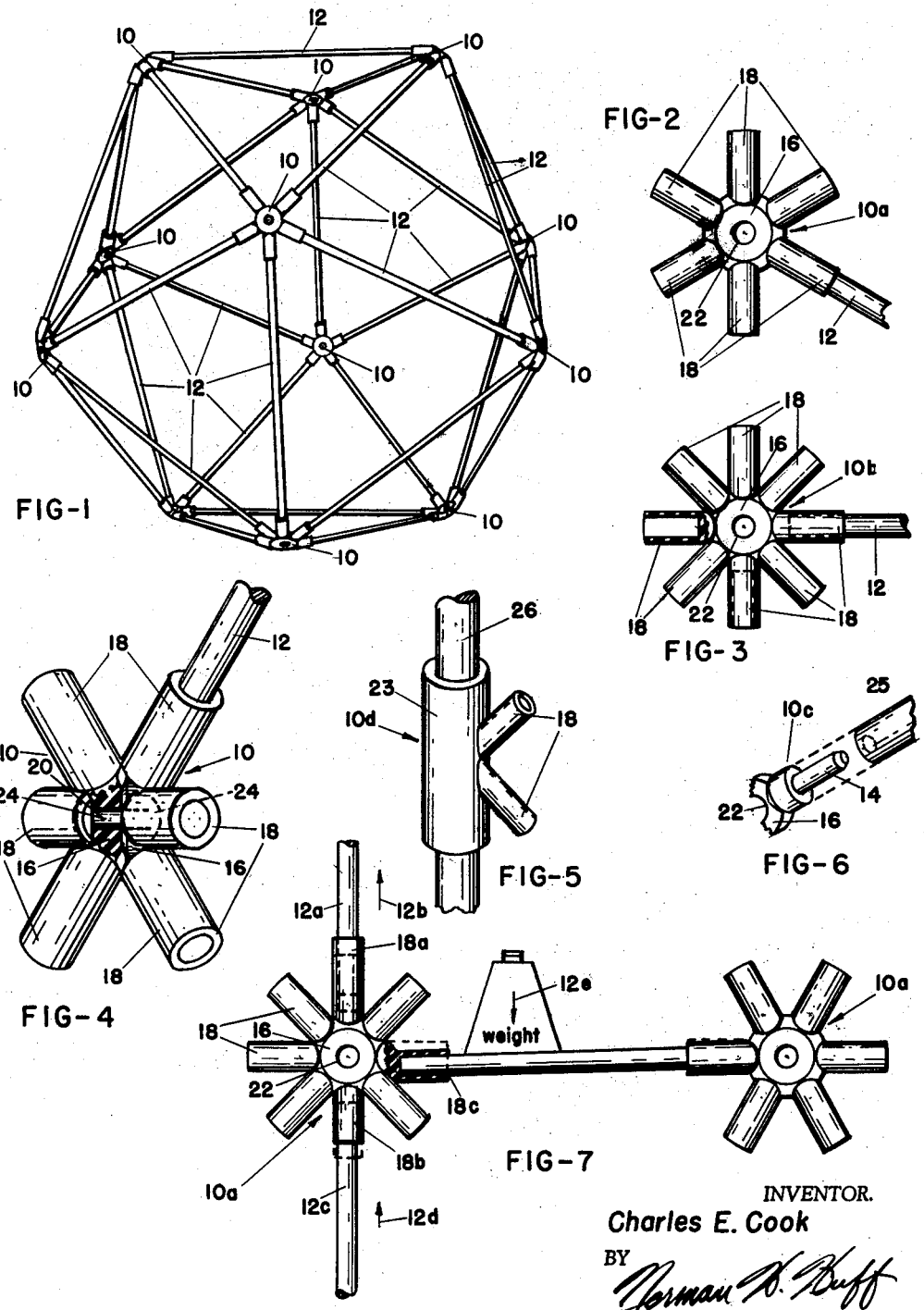
INVENTOR.
Charles E. Cook
BY

United States Patent Office

3,148,539
Patented Sept. 15, 1964

3,148,539
IDEAL SPHERICAL HINGE FOR
ANALYTICAL FRAMEWORK
Charles E. Cook, 216 N. Willow, Spokane, Wash.
Filed Jan. 20, 1959, Ser. No. 787,996
2 Claims. (Cl. 73—88)

My invention relates to framework for analyzing structural forces and more particularly to an ideal spherical hinge.

During formal studies in engineering and particularly architectural engineering, it is customary for instructors to assume that the system of structural members in space are joined together at their ends by what is termed "ideal spherical hinges." Many kinds of engineering structures such as steel-mill buildings, transmission-line towers, and cranes, employ a construction commonly called a space truss. This is a system of structural members in space joined together at their ends in such a way as to form a rigid space structure. In the fabrication of these structures, it is common practice to make the connections at the joints either by riveting or welding. Of course, the rigidity of this type of connection is bound to interfere to some extent with the free adjustment of the system to applied loads so that some secondary bending of the bars or structural members will be induced. In some cases the presence of secondary bending in a space structure may greatly affect the behavior under load, and it becomes necessary to consider this effect in detail. Also it is desirable to study in detail the effect of pressures on the space members to determine whether they are transmitted to the several members as compression or tension. Whenever a structure employing space trusses is subjected to the action of several applied loads, the influence of these external forces will induce internal forces in the various structural members, and the determination of these internal forces constitutes the analysis of the truss.

In dealing with these problems, initially the instructor or engineer conventionally makes the ideal assumptions that (1) the bars themselves are weightless, (2) they are connected at their ends by ideal hinges, and (3) external forces are applied only at the joints. As more complex studies are entered into the weight of the bars and the various locations of applying external force are taken into consideration.

The present invention lies in the provision of a model framework in which the structural elements are united by ideal spherical hinges of resilient material so that the deflections of the hinges may be visually determined and thus the engineering conclusions of the student or engineer may be visually proven or disproven as to compression, tension and the induced bending moment with respect to each of the members. These stresses result in distortions or deflections of the ideal spherical hinge to visually illustrate the analysis.

At present it is conventional to visually illustrate architectural structures or frameworks by rigidly securing the ends of the several structural members. The undesirable result of this method is obvious since the several reactions will not be readily apparent from visual inspection of a model so constructed.

Throughout this work, the word "framework" is used to mean the frame of a structure for enclosing space which is skeletal as when made of interconnected struts to form truss members, and the invention relates directly to relatively small light-weight models or structures as opposed to full scale architectural structures.

By the term "ideal spherical hinge" I mean a device for connecting on substantially radially projected axes selected from the maximum number physically possible in a sphere the ends, and in some instances intermediate points, of a system of structural members or struts in space to form a rigid space structure conventionally termed a "space truss."

Obviously, in view of the great influx of educational toys, the present invention may also be very conveniently employed as a toy in the class similar to the well known Erector set, and it is my desire to claim the invention broadly to include in addition to its relationship and use in analytical structural framework, devices of amusement of the same or similar character.

It is a further object of the present invention to provide an ideal spherical hinge by means of which plural structural members of a framework may be quickly and easily united without employing the conventional, laborious, and time consuming fasteners such as bolts and nuts.

Yet another object of the invention lies in the provision of an ideal spherical hinge adapted to receive and connect the ends and intermediate points of plural structural members in space, and which is resilient so that the compression, tension, and bending moments present in the framework elements secured to the hinge will effect visual deflections to the hinge.

It is another object of the present invention to provide plural structural members and ideal spherical hinges with which one may readily assemble geometric and structural shapes for the purpose of experimentation and illustrations of scientific concepts involved in the sciences of geometry and structures which will visually reveal and illustrate the theories involving types of joints and laws of static force in structures relative to applied loads, simple tension and compression, bending moment, shear, axial and transverse forces in frames, trusses, space frames, simple, compound, and complex space trusses, all of which forces are in this work comprehended in the terms "stresses, stress analysis," and similar phrases.

It is therefore another object of this invention to provide the said framework components to enable one to readily assemble and disassemble experimental design concepts.

Yet another object of the present invention is to provide a resilient ideal spherical hinge which when secured to another similar hinge will permit multiplication of the means for securing framework members.

The accompanying drawing discloses a preferred embodiment of the present invention along with certain sub-generic species thereof and similar reference numerals are employed to designate similar parts throughout the several views.

In the drawings:

FIGURE 1 is a perspective view of a polyhedral framework showing plural structural members united by ideal spherical hinges;

FIGURES 2 and 3 are plan views of the ideal spherical hinges, one having six and one having eight sockets for frictionally receiving structural members;

FIGURE 4 is a view partially in elevation and partially in diametric cross section showing a pair of said hinges secured relative to each other;

FIGURE 5 is a modified species of an ideal spherical hinge;

FIGURE 6 is an exploded fragmentary perspective view showing a further modification of an ideal spherical hinge and one structural member; and FIGURE 7 is a plan view having portions broken away for convenience of illustration and showing a pair of hinges interconnected by a structural member and the visual deflections of said hinge as effected by tension, compression, and bending moments on various structural members.

Referring now more particularly to the drawing, the numeral 10 indicates in its entirety an ideal spherical hinge. The numerals 10a, 10b, 10c, and 10d designate modifications or alternate species thereof.

Releasably secured in sockets 18 of the ideal spherical hinges 10, 10a, 10b, and 10d are structural members 12 or 26 which are here seen to be cylindrical dowel pins retained therein by frictional engagement. In FIGURE 6 the numeral 25 designates a tubular structural member which is adapted to receive into its hollow ends and frictionally secure a plug 14.

It will be noted that the ideal spherical hinges 10, 10a, 10b, and 10c are provided with a hub portion 16 from which radiate the several sockets 18 or plugs 14 which constitute means for securing the structural members to the hinges. It will be understood that there may be any number of the means for securing the structural members as found physically possible and desirable.

Inspection of FIGURE 4 will reveal that the axial dimension of the hub portions 16 is somewhat reduced over a parallel dimension of the sockets 18. When a button or other fastener 20 having heads 24—24 is disposed in the aperture 22 centric of the hub 16 so that the hub portions are releasably secured together in face to face engagement, the sockets 18 of companion ideal spherical hinges 10, 10a, 10b, or 10c impinge against each other and effect deflection of the sockets from their normal radial positions perpendicular to the axes of the respective hinge apertures 22 to assume angular positions relative to said axis. Each socket 18 is adapted to receive an end portion of a structural member 12 and releasably secure it therein by frictional engagement.

I have employed untreated wooden dowels for this purpose and also painted dowels and experimented with other materials such as the well known plastics, and have determined for economic reasons to employ painted wooden dowels as structural members 12 in the practice of this invention. The paint provides a smooth surface and therefore an improved frictional contact between the portion of the structural member 12 contained in its socket 18 and the socket itself so as not to be easily removed accidentally.

The ideal spherical hinges of this invention are formed from natural or synthetic rubber or other material which is resilient so that the hinge will deflect by relatively slight pressures applied to the framework constructed by employing the structural members 12 and hinges as disclosed herein.

Examination of FIGURE 7 will reveal that when a structural member as 12a in a framework is under tension, a relative pressure between the hinge and the member 12a in the direction of the arrow 12b is applied, thus deflecting the socket 18 from the broken line position of FIGURE 7 to the full line position 18a, thus visually indicating the presence of tension in the member 12a. In the same figure, the structural member 12c may be under compression with a relative pressure between the hinge and member 12c applied in the direction of arrow 12d wherein its respective socket 18 will be deflected from the broken line position to the full line position 18b, for visually indicating the presence of compression pressure in the structural member 12c.

When a structural member of FIGURE 7 has its end frictionally engaged in the socket 18 as indicated, and pressure in the direction indicated by the arrow 12e is applied, the socket 18 is deflected from its normal projection to a position indicated by the full line 18c. Bending and shearing moment are visually determined by the deformation of the socket as shown.

Referring now more particularly to FIGURE 5, it will be noted that instead of the hub 16, I have provided in a modified species of ideal spherical hinge an elongated tubular socket 23 from which extend conventional sockets 18 on axes which are angular in a common plane relative to the axis of tubular socket 23. The bore or aperture 25 of the tubular portion 23 is seen to be enlarged over that of the sockets 18 to receive an enlarged structural member to provide added strength to the structural member 26 if desired.

In FIGURE 6, the ideal spherical hinge 10c has a hub portion 16 with an aperture 22 but instead of the sockets 18 I provide plugs 14 which may be received in the tubular structural members 25 as an alternate form of assembly. It will be understood that the hinges are each formed from material of sufficient resiliency that the relatively slight pressures of tension, compression, bending moment and so forth may be visually observed as deflections of the hinges.

Having thus described my invention, I desire to secure by Letters Patent of the United States the following:

1. An ideal spherical hinge of resilient material for facilitating visually determinable deflection thereof by relatively slight pressures, comprising a central hub having an aperture therethrough and adapted to axially receive and releasably secure a structural member; plural sockets having their inner ends joined to said hub by reduced resilient means for facilitating deflection of said sockets from their normal position radiating from the axis of said aperture to other selected radial and axial angularity with respect to the axis of said aperture; and means for frictionally receiving and securing a framework member in each said socket.

2. An ideal spherical hinge of resilient material for facilitating visually determinable deflection thereof by relatively slight pressures comprising: a central hub having an aperture therethrough and adapted to axially receive and releasably secure a structural member; plural sockets of said material secured at their inner reduced ends to said hub and normally radiating from the axis of said aperture; the dimension of said hub axially of said aperture being substantially less than the parallel dimension of said sockets whereby to provide increased flexibility for pressure sensitive deformation.

References Cited in the file of this patent

UNITED STATES PATENTS

| | | |
|---|---|---|
| 1,843,115 | Ferris | Feb. 2, 1932 |
| 2,205,102 | Loudenslager | June 18, 1940 |
| 2,722,772 | Stearns | Nov. 8, 1955 |

FOREIGN PATENTS

| | | |
|---|---|---|
| 425,909 | Great Britain | Mar. 21, 1935 |
| 827,915 | Germany | Jan. 14, 1952 |
| 1,069,155 | France | Feb. 10, 1954 |
| 545,995 | Italy | July 9, 1959 |